United States Patent
Dahl

(10) Patent No.: US 9,184,926 B2
(45) Date of Patent: Nov. 10, 2015

(54) METHOD, SYSTEM, AND COMPUTER-READABLE STORAGE MEDIUM FOR REMOTE CONTROL OF A VIDEO CONFERENCING DEVICE

(75) Inventor: Axel Dahl, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 1035 days.

(21) Appl. No.: 12/986,740

(22) Filed: Jan. 7, 2011

(65) Prior Publication Data

US 2011/0175977 A1 Jul. 21, 2011

Related U.S. Application Data

(60) Provisional application No. 61/296,342, filed on Jan. 19, 2010.

(30) Foreign Application Priority Data

Jan. 18, 2010 (NO) .................................... 20100075

(51) Int. Cl.
*H04N 7/14* (2006.01)
*H04L 12/18* (2006.01)
(Continued)

(52) U.S. Cl.
CPC ........ *H04L 12/1822* (2013.01); *H04L 65/1069* (2013.01); *H04L 65/403* (2013.01);
(Continued)

(58) Field of Classification Search
USPC ........ 348/14.01, 14.08, 14.12, 14.09, E7.083, 348/423.1, 429.1, 211.12; 379/88.13, 379/93.25, 93.21, 158, 202.01, 205.01
See application file for complete search history.

(56) References Cited

U.S. PATENT DOCUMENTS 8,145,516 B2 * 3/2012 Blanchard et al. ........... 705/7.12
2004/0216123 A1 10/2004 Seebaldt
(Continued)

FOREIGN PATENT DOCUMENTS

WO WO 2007/011234 A1 1/2007
WO WO 2008/115077 A1 9/2008

OTHER PUBLICATIONS

International Search Report and Written Opinion issued Apr. 8, 2011 in PCT/NO/2011/000018.
(Continued)

*Primary Examiner* — Yosef K Laekemariam
(74) *Attorney, Agent, or Firm* — Lempia Summerfield Katz LLC

(57) ABSTRACT

A method, system, and computer-readable storage medium for remotely controlling a video conferencing device registered with a video conferencing management server. The method includes establishing a connection to the video conferencing management server via a local access network (LAN), receiving a list of video conferencing devices registered with the video conferencing management server, selecting a video conferencing device from the list of video conferencing devices registered with the video conferencing management server, downloading a remote control application from the video conferencing management server, receiving registration information for the selected video conferencing device from the video conferencing management server, the registration information including at least an internal LAN address of the selected video conferencing device, establishing, using the registration information, a connection directly with the selected video conferencing device, and controlling the selected video conferencing device using the remote control application.

14 Claims, 2 Drawing Sheets

(51) Int. Cl.
  *H04M 3/56* (2006.01)
  *H04N 7/15* (2006.01)
  *H04N 21/4143* (2011.01)
  *H04N 21/4788* (2011.01)
  *H04L 29/06* (2006.01)
  *H04L 29/08* (2006.01)

(52) U.S. Cl.
  CPC .............. *H04L67/125* (2013.01); *H04L 67/34* (2013.01); *H04M 3/567* (2013.01); *H04N 7/15* (2013.01); *H04N 21/4143* (2013.01); *H04N 21/4788* (2013.01); *H04M 2203/1016* (2013.01)

(56) References Cited

U.S. PATENT DOCUMENTS

| | | | |
|---|---|---|---|
| 2008/0134200 A1 | 6/2008 | Seebaldt | |
| 2008/0235362 A1* | 9/2008 | Kjesbu et al. | 709/223 |
| 2009/0187986 A1 | 7/2009 | Ozeki | |
| 2010/0137020 A1* | 6/2010 | Rofougaran | 455/550.1 |

OTHER PUBLICATIONS

International Type Search Report issued Aug. 18, 2010, in No. 20100075.
Search Report issued Aug. 10, 2010 in Norwegian Patent Application No. 20100075.
Tandberg:"Tandberg Management Suite v9 Release Document", Apr. 1, 2005, 14:23, XP-002559337, D50302, Rev, 1.8, URL: http://ftp.tandberg.com/pub/software/tms/Software_Release_Notes/TANDBERG Management Suite Software Release Notes(TMS9). pdf, pp. 1-38.
"Installation and Getting Started Guide", Tandberg Management Suite Version 12no. 014389 Revision 01, Feb. 2009, XP002597001, URL:http://ftp.tandberg.com/pub/software/tms/tms12/TMS12. 1CD.zip, pp. 1-80.
Tandberg Management Suite Data Sheet, Jul. 2004, XP002597002, URL:http://WWW.ivci.com/pdf/videoconferencing_tandberg_management_suite_data_sheet.pdf, 2 pages.

* cited by examiner

METHOD, SYSTEM, AND COMPUTER-READABLE STORAGE MEDIUM FOR REMOTE CONTROL OF A VIDEO CONFERENCING DEVICE

CROSS-REFERENCE TO RELATED APPLICATIONS

The present application claims the benefit under 35 U.S.C. §119 from U.S. Provisional Application No. 61/296,342, filed Jan. 19, 2010, and claims priority to Norwegian Patent Application No. 20100075, filed Jan. 18, 2010, which are both herein incorporated by reference in their entirety.

BACKGROUND

1. Technological Field

The present disclosure relates to a method, system, and computer-readable storage medium for remotely controlling a video conferencing device from a computer device.

2. Description of the Related Art

Conventional videoconferencing systems comprise a number of end-points communicating real-time video, audio and/or data streams over and between various networks such as Wide Area Network (WAN), Local Area Network (LAN), and circuit switched networks.

A number of videoconference systems residing at different sites may participate in the same conference, most often, through one or more Multipoint Control Units (MCUs) performing, i.e., switching functions to allow the audiovisual terminals to intercommunicate properly.

As videoconferencing involves various resources and equipment simultaneously interoperating at different localizations and capabilities, there is a need for the possibility to manage the resources involved both for scheduled and ad hoc videoconferences.

Videoconferencing systems are therefore often provided with a management system. A management system is a module that is used to schedule or book resources at any given point in time. The management system allows a user to request resource usage at a given time, and either allow or disallow the usage at that time. Management systems are often used for scheduling the use of meeting rooms, network resources, video systems, etc. The management system is connected to a database containing updated information regarding all accessible resources such as, but not limited to, MCUs, gateways, routers, end-points, etc. The management system generally operates with an intuitive web interface requiring no additional installation on the user terminal other than a conventional web browser.

In a typical office environment tens or even hundreds of employees may share access to a plurality of different video conferencing systems in meeting rooms or the like. When utilizing different types of systems, operation and settings are easily forgotten. Since many employees share one or more endpoints, personal information such as last numbers called/received, speed dial listings, or the like, may be erased from such a shared endpoint.

In addition, control devices for a video conferencing device generally comprise numerical keyboards only. Numerical keyboards work well to dial numerical numbers, however, common Uniform Resource Identifiers (URIs), such as e-mail addresses, used in video conferencing is cumbersome to type using the multi-tap text entry available using numerical keyboards.

As most users of video conferencing devices already have a keyboard available at their desk (i.e., the keyboard connected to their computers), it is beneficial to control their desk video conferencing systems using their computer to also control their video conferencing device.

A software remote for wireless communication devices is known from U.S. Patent Publication No. 2008/02235362, incorporated entirely by reference herein. However, the conventional remote control may be complex within a company LAN as it deals with communication from external devices sending requests through a firewall to a video conferencing management server which in turn, proxies the request to a specific video conferencing device or delegates the request to a management platform.

SUMMARY

A method, system, and computer-readable storage medium for remotely controlling a video conferencing device registered with a video conferencing management server. The method includes establishing a connection to the video conferencing management server via a local access network (LAN), receiving a list of video conferencing devices registered with the video conferencing management server, selecting a video conferencing device from the list of video conferencing devices registered with the video conferencing management server, downloading a remote control application from the video conferencing management server, receiving registration information for the selected video conferencing device from the video conferencing management server, the registration information including at least an internal LAN address of the selected video conferencing device, establishing, using the registration information, a connection directly with the selected video conferencing device, and controlling the selected video conferencing device using the remote control application.

As should be apparent, a number of advantageous features and benefits are available by way of the disclosed embodiments and extensions thereof. It is to be understood that any embodiment can be constructed to include one or more features or benefits of embodiments disclosed herein, but not others. Accordingly, it is to be understood that the embodiments discussed herein are provided as examples and are not to be construed as limiting, particularly since embodiments can be formed to practice the invention that do not include each of the features of the disclosed examples.

BRIEF DESCRIPTION OF THE DRAWINGS

The disclosure will be better understood from reading the description which follows and from examining the accompanying figures. These are provided solely as non-limiting examples of embodiments. In the drawings.

DETAILED DESCRIPTION

The non-limiting embodiments of the present disclosure introduce a method of remotely controlling a video conferencing device from a computer device, such as a desktop computer, a laptop computer, a smart phone, a Personal Digital Assistant (PDA), or the like. This is utilised by communicating with a server (e.g., a Conferencing Management server), and receiving registration information of a video conferencing device one would like to control remotely, downloading a remote control application from the conferencing management server, and using the received information to connect the remote control application directly with the video conferencing device.

Figure 1:
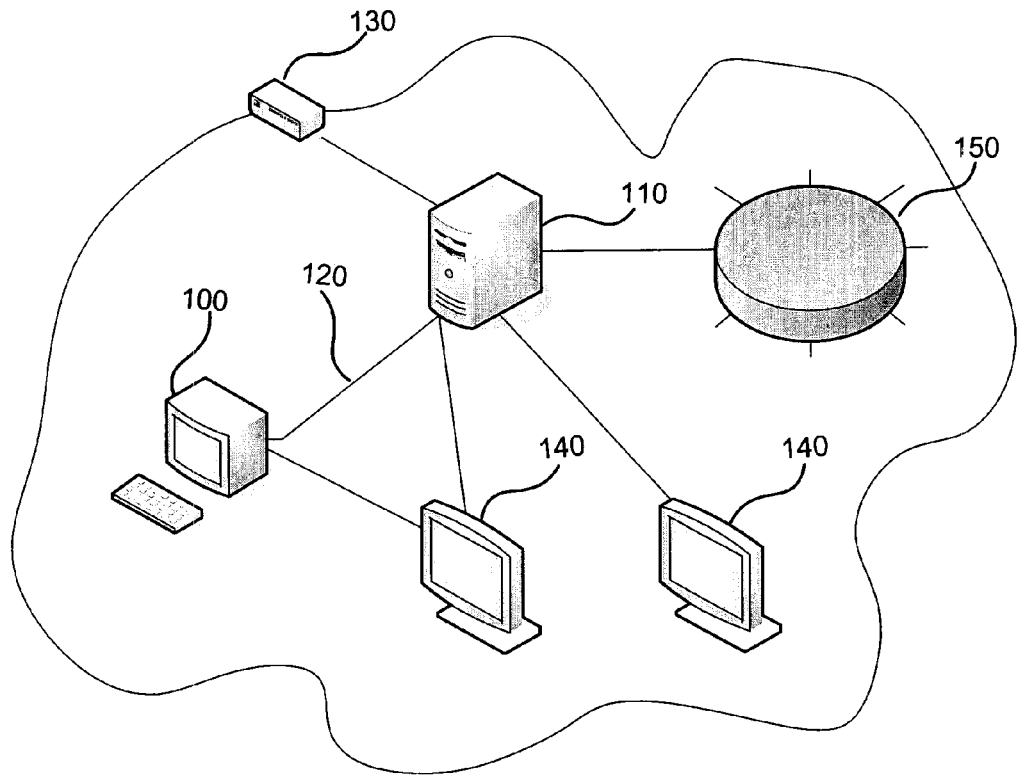
FIG. 1 is a block diagram showing a configuration of a system according to an embodiment of the present disclosure.

FIG. 1 is a block diagram showing a configuration of a system according to a non-limiting embodiment of the present disclosure. The system in FIG. 1 includes at least a computer device 100 and a server 110. Computer device 100 may be a desktop computer, a portable laptop computer, a smart phone, a PDA, or the like. The computer device 100 is configured to communicate with the internal Local Area Network (LAN) 120. The LAN 120 may be a wired network or a wireless network (WLAN), both referred to herein as LAN.

The computer device 100 comprises a processing device, a memory for storing processing instructions, and other data, as is described with reference to FIG. 3. The computer device 100 further comprises at least one adapter for enabling communication with the LAN, either wired or wireless, with the network 120. A remote control application according to the present disclosure may be a computer program which includes instructions which, when executed by the processing device in the mobile communication device, causes the computer device to perform a method in accordance with the present disclosure, as described by example in the following detailed description, in particular with reference to FIG. 2. The implementation of such instructions involves routine abilities of the skilled person, based on the present specification. Such instructions may be tangibly embodied in the memory of the mobile communication device, or alternatively, they may be tangibly embodied in another memory, such as semiconductor memory, or on a separate storage device such as an optical or magnetic medium (e.g., computer readable storage mediums).

The server 110 provides an interface with an external network 130, and is further operably connected to several (two illustrated by example) video conferencing devices 140 on the internal communication network 120.

The server 110 may be a management system controlling a range of telecommunication units and other equipment, as described above, or may also be a single telecommunication unit, such as a video conferencing end-point or the like.

The server 110 comprises a processing device and a memory for storing processing instructions, and other data, as is described with reference to FIG. 3. The server 110 further comprises a wireless communication adapter for enabling wireless communication with the network 120. The server 110 runs a computer program (stored in a computer readable storage medium) that includes instructions which, when executed by the processing device in the server 110, causes the server 110 to perform a method in accordance with the examples in the following detailed description. The implementation of such instructions involves routine abilities of the skilled person, based on the present specification. Such instructions may be tangibly embodied in the memory of the server, or alternatively, may be tangibly embodied in another memory, such as semiconductor memory, or on a separate storage device such as an optical or magnetic medium (e.g., computer readable storage mediums).

In a non-limiting exemplary embodiment of the present disclosure, the server 110 in FIG. 1 is a server running a Video Conferencing Management Program (VCMP). As mentioned above, video conferencing systems are often provided with a management system, or more specifically a VCMP. VCMPs are used for scheduling the use of network resources, video conferencing systems, etc. The VCMP is connected to a database containing updated information regarding all accessible resources such as Multipoint Control Units (MCUs), gateways, routers, video conferencing end-points, or the like.

Further, a VCMP, for example, provides system and resource overview, allowing the user to create, edit, and delete reservations, reserve resources for dial-in participants and specify bandwidth and network settings. The VCMP may also support automatic call routing and automatic selection of point-to-point connection, including one or more MCUs. Further, the VCMP may control any video conferencing end-point 140 connected to the VCMP. The VCMP operates with an intuitive web interface requiring no additional installation on the user terminal other than a conventional web browser.

As mentioned above, the server 110 is connected to one or more databases. As shown in FIG. 1, in one embodiment of present disclosure the server 110 is connected to a user database 150 containing records of video conferencing endpoints connected to the VCMP running on the server 110, and information related to the end-points, such as the entry identification (ID), entry name (for example, name displayed in phonebook service, e.g., name of the endpoint user or name describing endpoint location), end-point IP-address, username and password of the endpoint, alias, ISDN-number, GSM-number, geographical location, organization affiliation, or the like. The server 110 uses at least parts of user database 150 records to generate a phone book service for its connected endpoints and their users. The phone book service is also used when scheduling video conference calls through a web based user interface connected to the server 110 or when making a call from an endpoint.

According to one exemplary embodiment of the present disclosure, the computer device 100 can connect to the video conferencing management server 110, and receive a list of all video conferencing devices 140 registered with the server 110. When receiving the list of the registered video conferencing devices 140, the computer device 100 can select a video conferencing device from the list it would like to control remotely. The list of registered video conferencing devices may be presented to the computer device 100 as a web-page wherein the selection of the registered video conferencing device can be performed by selecting or clicking on the requested video conferencing device.

Upon selecting a video conferencing device to control remotely, the computer device 100 downloads a remote control application from the video conferencing management server 110. Alternatively, the computer device 100 may check whether the computer device 100 already has the remote control application installed, in which case the computer device 100 may just launch the remote control application.

When the remote control application is launched on the computer device 100, the remote control application receives registration information from the video conferencing management server 110 for the selected video conferencing device. The registration information includes at least an internal LAN address (i.e., an IP-address) of the selected video conferencing device 140. Upon receiving the internal LAN address, the remote control application can establish a direct communication with the selected videoconferencing device 140 over the internal network 120.

A username and password may also be required to connect directly with the selected video conferencing device 140, in which case the username and password may also be supplied to the remote control application from the video conferencing management server 110.

According to another embodiment of the present disclosure, the system comprises a feature to avoid hijacking of a video conferencing device by a person not sitting in front of the selected video conferencing device. Upon the computer device 100 connecting directly with the selected video conferencing device (for example, one of devices 140), a confirmation number is displayed on a screen of the selected video conferencing device 140, whereupon typing or entering the confirmation number into the remote control application, the remote control application is allowed access to the selected video conferencing device 140.

When the direct connection is established, the remote control application can control the selected video conferencing device 140 remotely. According to an embodiment of the present disclosure, the remote control application can establish a call by accepting an incoming call to the selected video conferencing device 140, when, for example, being presented with an Accept/Reject pop-up menu on a screen of the computer device 100.

According to another embodiment of the present disclosure, the remote control application can establish a call dialing a number to a different user and/or device using a keyboard of the computer device 100.

According to another embodiment of the present disclosure, the remote control application can establishing a call to a user and/or device based on a phonebook lookup at the video conferencing management server 110 (e.g., search for people to contact from the resources (phone book) controlled by the server 110).

The following example describes, in detail, an exemplary method of setting up a remote control of a video conferencing device according to the present disclosure.

Figure 2:
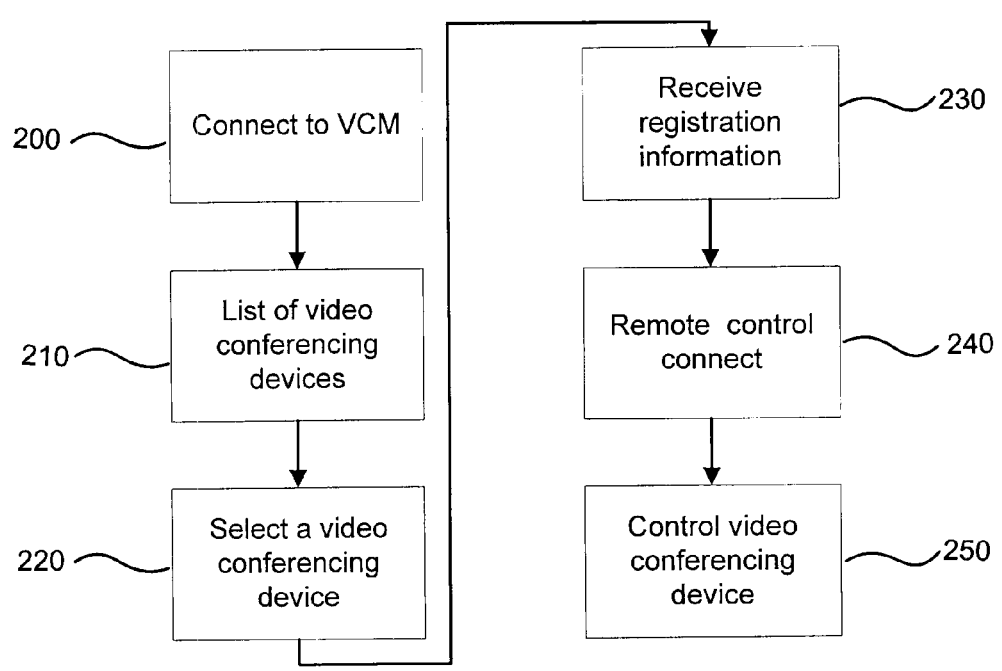
FIG. 2 is a flow diagram showing an exemplary remote control session according to an embodiment of the present disclosure.

FIG. 2 is a flow diagram showing an embodiment of a method according to the present disclosure by showing an exemplary client and server communication session from the client side. The illustrated process of FIG. 2 is a method in a mobile communication device for managing conference equipment.

As can be seen in step 200 in the flow diagram of FIG. 2, a user of computer device 100 starts by launching an application establishing a connection to the video conference management server 110 on his or her mobile phone. The aforementioned application may be a web browser or the like opening a Graphical User Interface (GUI) on the server 110. The computer device 100 and the conferencing management server 110 may be on the same internal network 120.

Next, in step 210, the computer device 100 receives a list of all video conferencing devices (i.e., devices 140) registered with the conferencing management server 110. The list could be a text file transmitted to the computer device 100 or a graphical presentation of the video conferencing devices 140 in a web browser.

In step 220, the user of the computer device 100 selects one of the listed registered video conferencing devices 140, for example, by clicking on the graphical presentation or by sending a text based communication message to the server 110. Upon selecting a video conferencing device 140 to control remotely, the computer device 100 downloads a remote control application from the video conferencing management server 110. Alternatively, the computer device 100 may check whether the computer device 100 already had the remote control application installed. In a case that the remote control application is already installed in the computer device 100, the computer device 100 would just launch the remote control application.

Continuing to step 230, the remote control application receives registration information from the video conferencing management server 110 for the selected video conferencing device 140. The registration information includes at least an internal LAN address (i.e., an IP-address) of the selected video conferencing device 140. In some instances more registration information may be required to connect to the selected video conferencing device 140, in which case the additional required information may also be sent to the remote control application. A username and a password may also be required to connect directly with the selected video conferencing device 140, in which case the username and password may also be supplied to the remote control application from the video conferencing management server 110.

In step 240, upon receiving the internal LAN-address and other registration information from the video conferencing management server 110, the remote control application establishes a direct communication with the selected videoconferencing device 140 over the internal network 120.

According to another embodiment of the present disclosure, the system comprises a feature to avoid hijacking of a video conferencing device by a person not sitting in front of the selected video conferencing device. When trying to establish a connection directly with the selected video conferencing device 140, the video conferencing device 140 can display a confirmation number on the display screen. The remote control application may be given access to the selected video conferencing device 140 when the user of the computer device 100 types the confirmation number into the remote control application.

In step 250, when direct connection between the remote control application and the selected video conferencing device 140 has been established, the remote control application can control several aspects of the connected video conferencing device 140. In particular, the user of the remote control application may establish a call by accepting an incoming call on the selected video conferencing device 140, when, for example, being presented with an Accept/Reject pop-up menu on a screen of the computer device 100.

According to an embodiment of the present disclosure, the remote control application can establish a call by dialing a number to a different user and/or device using a keyboard of the computer device 100.

According to another embodiment of the present disclosure, the remote control application can establishing a call to a user and/or device based on a phonebook lookup at the video conferencing management server 110 (e.g., search for people to contact from the resources (phone book) controlled by the server 110).

The above described non-limiting embodiments of the present disclosure provide a method and system for a computer remotely controlling a videoconferencing device on a same LAN, allowing, for example, the use of a computer keyboard to type URIs, accepting incoming calls without a user's hands leaving the keyboard of a user's computer, and the like. A software remote application simplifies the control of a desktop or room-type video conferencing device without relying on the numerical keyboards generally found on video conferencing devices.

Figure 3:
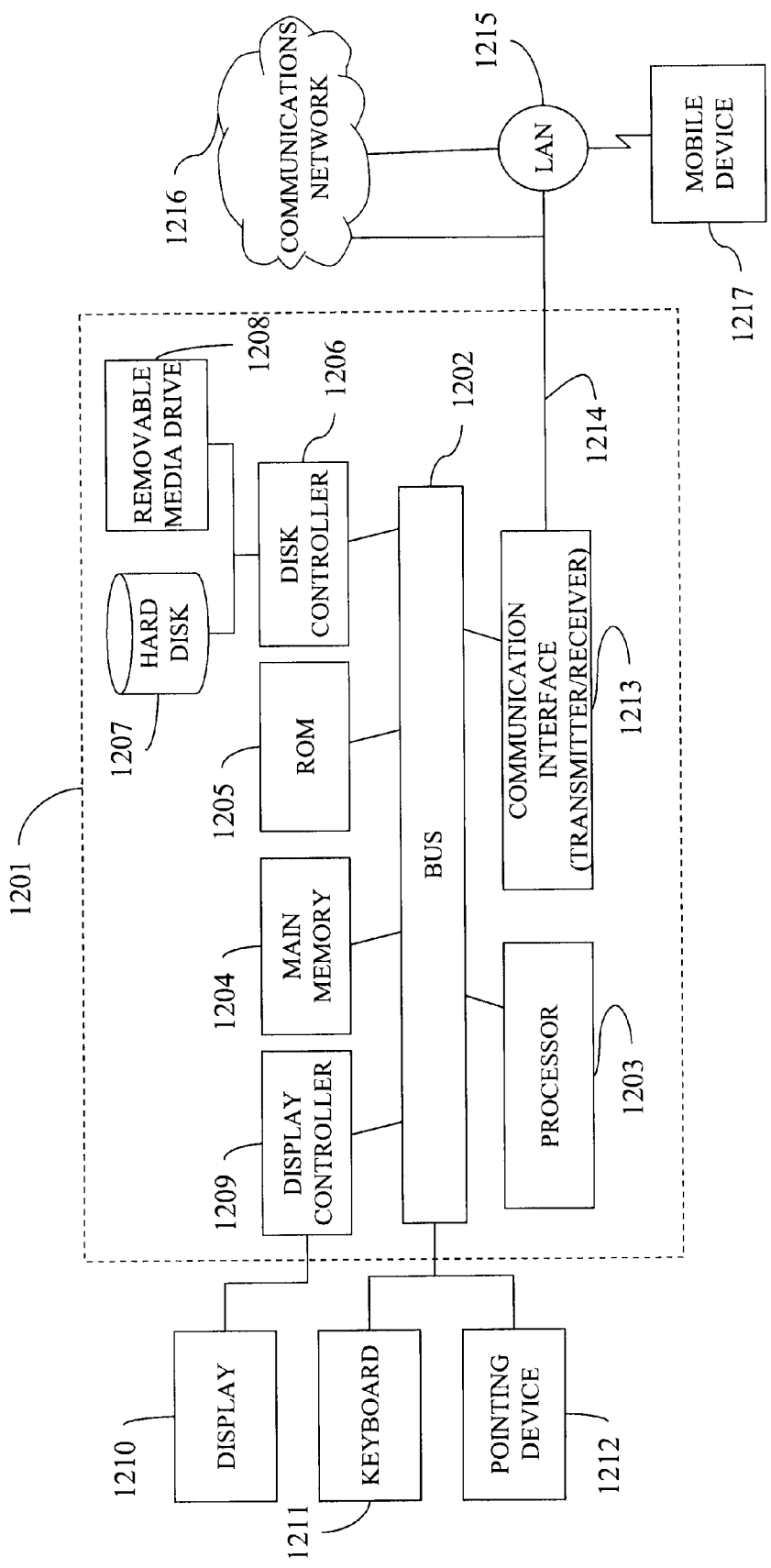
FIG. 3 illustrates a computer system upon which an embodiment of the present disclosure may be implemented.

FIG. 3 illustrates a computer system 1201 upon which an embodiment of the present disclosure may be implemented. The computer system 1201 may refer to the computer device 100, the server 110, and/or the video conferencing devices 140. The computer system 1201 may include processing units, or the like, configured to perform various processes (i.e., the process of FIG. 2). The computer system 1201 includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as the screen of computer device 100 or video conferencing device 140, for displaying information to a computer user. The computer system includes input devices, such as a keyboard 1211 and a pointing device 1212, for interacting with a computer user and providing information to the processor 1203. The keyboard 1211, for example, may be used by a user to enter various types of information (i.e., a confirmation number), as discussed above. The pointing device 1212, for example, may be a mouse, a trackball, a finger for a touch screen sensor, or a pointing stick for communicating direction information and command selections to the processor 1203 and for controlling cursor movement on the display 1210.

The computer system 1201 performs a portion or all of the processing steps of the present disclosure (for example, the steps of FIG. 2), in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1201, for driving a device or devices for implementing embodiments of the present disclosure, and for enabling the computer system 1201 to interact with a human user. Such software may include, but is not limited to, device drivers, operating systems, and applications software. Such computer readable media further includes the computer program product of the present disclosure for performing all or a portion (if processing is distributed) of the processing performed in implementing the embodiments of the present disclosure.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204. Transmission media, on the contrary, includes coaxial cables, copper wire and fiber optics, including the wires that make up the bus 1202. Transmission media may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215 (local area network 1215 and network 120 may be the same network), or to another communications network 1216 such as the Internet. For example, the communication interface 1213 may be a network interface card to attach to any packet switched LAN. As another example, the communication interface 1213 may be an integrated services digital network (ISDN) card. Wireless links may also be implemented. In any such implementation, the communication interface 1213 sends and receives electrical, electromagnetic or optical signals that carry digital data streams representing various types of information.

The network link 1214 generally provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214, and the communication interface 1213. Moreover, the network link 1214 may provide a connection through a LAN 1215 to a mobile device 1217 such as a personal digital assistant (PDA) laptop computer, or cellular telephone.

Further, it should be appreciated that the exemplary embodiments of the present disclosure are not limited to the exemplary embodiments shown and described above. While this invention has been described in conjunction with exemplary embodiments outlined above, various alternatives, modifications, variations and/or improvements, whether known or that are, or may be, presently unforeseen, may become apparent. Accordingly, the exemplary embodiments of the present disclosure, as set forth above are intended to be illustrative, not limiting. The various changes may be made without departing from the spirit and scope of the invention. Therefore, the disclosure is intended to embrace all now known or later-developed alternatives, modifications, variations and/or improvements.

The invention claimed is:

1. A method for a computer device remotely controlling a video conferencing device registered with a video conferencing management server, the method comprising:
    establishing a connection to the video conferencing management server via a local access network (LAN);
    receiving a list of video conferencing devices registered with the video conferencing management server;
    selecting a video conferencing device from the list of video conferencing devices registered with the video conferencing management server;
    determining that a remote control application has not been installed on the computer device;
    downloading the remote control application from the video conferencing management server in response to the remote control application not being installed on the computer device;
    receiving, at the computer device, an access code displayed by the selected video conferencing device;
    receiving registration information for the selected video conferencing device from the video conferencing management server, the registration information including at least an internal LAN address of the selected video conferencing device;
    establishing, using the registration information and in response to the access code being entered into the remote control application, a connection directly with the selected video conferencing device;
    controlling the selected video conferencing device using the remote control application; and
    accepting, by the computer device using the remote control application, an incoming call to the video conferencing device.

2. The method according to claim 1, wherein the computer device, the video conferencing management server, and the selected video conferencing device are connected to the same LAN.

3. The method according to claim 1, wherein the internal LAN address is a local Internet Protocol (IP) network address.

4. The method according to claim 1, wherein the registration information further includes a username and a password of the selected video conferencing device.

5. The method according to claim 1, further comprising:
    establishing a call from the selected video conferencing device by dialing a number to at least one of a different user and a different video conferencing device.

6. The method according to claim 1, further comprising:
    establishing a call to at least one of a user and a video conferencing device based on a phonebook lookup at the video conferencing management server.

7. A system for remotely controlling a video conferencing device, the system comprising:
    a computer device configured to communicate over a local area network (LAN);
    a video conferencing management server configured to communicate over the LAN; and
    at least one video conferencing device registered with the video conferencing management server, wherein
    the computer device is further configured to
        establish a connection to the video conferencing management server via the LAN,
        receive a list of the video conferencing devices registered with the video conferencing management server,
        select a video conferencing device from the list of registered video conferencing devices,
        determine that a remote control application has not been installed on the computer device;
        download the remote control application from the video conferencing
        management server in response to the remote control application not being installed on the computer device,
        receive registration information for the selected video conferencing device from the video conferencing management server, the registration information including at least an internal LAN address of the selected video conferencing device,
        receive entry of an access number displayed by the selected video conferencing device,
        establish, using the registration information and in response to the access number being entered in the remote control application, a connection directly with the selected video conferencing device,
        control the selected video conferencing device using the remote control application, and
        accept, using the remote control application, an incoming call to the video conferencing device.

8. The system according to claim 7, wherein the computer device, the video conferencing management server, and the selected video conferencing device are connected to the same LAN.

9. The system according to claim 7, wherein the internal LAN address is a local Internet Protocol (IP) network address.

10. The system according to claim 7, wherein the registration information further includes a username and a password of the selected video conferencing device.

11. The system according to claim 7, wherein
    the selected video conferencing device is further configured to display a confirmation number on a screen of the selected video conferencing device in response to the computer device connecting directly with the selected video conferencing device, and the computer device is further configured to allow the remote control application access to the selected video conferencing device in response to the confirmation number being entered into the remote control application.

12. The system according to claim 7, wherein the remote control application is configured to establish a call from the selected video conferencing device by dialing a number to at least one of a different user and a different video conferencing device.

13. The system according to claim 7, wherein the remote control application is configured to establish a call to at least one of a user and a video conferencing device based on a phonebook lookup at the video conferencing management server.

14. A non-transitory computer-readable storage medium including computer executable instructions, wherein the instructions, when executed by a computer, cause the computer to perform a method for remotely controlling a video conferencing device registered with a video conferencing management server, the method comprising:

establishing a connection to the video conferencing management server via a local access network (LAN);

receiving a list of video conferencing devices registered with the video conferencing management server;

selecting a video conferencing device from the list of video conferencing devices registered with the video conferencing management server;

determining that a remote control application has not been installed on the computer device;

downloading the remote control application from the video conferencing management server in response to the remote control application not being installed on the computer device;

receiving registration information for the selected video conferencing device from the video conferencing management server, the registration information including at least an internal LAN address of the selected video conferencing device;

receiving, at the computer device, an access number displayed by the selected video conferencing device;

establishing, using the registration information and in response to the access number being entered in the remote control application, a connection directly with the selected video conferencing device;

controlling the selected video conferencing device using the remote control application; and accepting, by the computer using the remote control application, an incoming call to the video conferencing device.

\* \* \* \* \*